United States Patent
Ma et al.

(10) Patent No.: US 12,061,176 B2
(45) Date of Patent: Aug. 13, 2024

(54) TEST APPARATUS FOR FLEXIBLE SCREEN

(71) Applicant: KunShan Go-Visionox Opto-Electronics Co., Ltd., Kunshan (CN)

(72) Inventors: Yuexing Ma, Kunshan (CN); Shuanzhu Dong, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 328 days.

(21) Appl. No.: 17/667,133

(22) Filed: Feb. 8, 2022

(65) Prior Publication Data

US 2022/0163433 A1 May 26, 2022

Related U.S. Application Data

(63) Continuation of application No. PCT/CN2020/125813, filed on Nov. 2, 2020.

(30) Foreign Application Priority Data

Jan. 10, 2020 (CN) .......................... 202010025724.7

(51) Int. Cl.
  *G01N 3/04* (2006.01)
  *G01N 3/26* (2006.01)
  *G09F 9/30* (2006.01)

(52) U.S. Cl.
  CPC ............ *G01N 3/04* (2013.01); *G01N 3/26* (2013.01); *G01N 2203/0017* (2013.01);
  (Continued)

(58) Field of Classification Search
  CPC .... G01N 3/04; G01N 3/26; G01N 2203/0017; G01N 2203/0075; G01N 2203/0647; G01N 2203/0417; G09F 9/301
  See application file for complete search history.

(56) References Cited

U.S. PATENT DOCUMENTS

2014/0085230 A1* 3/2014 Sato ...................... G06F 3/0484
  345/173
2015/0033870 A1* 2/2015 Lee .......................... G01N 3/20
  73/849
(Continued)

FOREIGN PATENT DOCUMENTS

CN  102384832 B  11/2013
CN  203629786 U   6/2014
(Continued)

OTHER PUBLICATIONS

English translation of CN209342509, accessed from iq.ip.com Feb. 21, 2024.*

(Continued)

*Primary Examiner* — Kristina M Deherrera
*Assistant Examiner* — Jean F Morello
(74) *Attorney, Agent, or Firm* — Maier & Maier, PLLC

(57) ABSTRACT

A testing apparatus for a flexible screen includes a slide rail, a reel, and a clamping member. The reel is disposed at an end of the slide rail in the extension direction of the slide rail which the axial direction of the reel is perpendicular to. The reel has a hollow structure and is connected to a evacuating device through a gas path formed in the hollow structure to enable the evacuating device to vacuumize inside of the reel to fit the flexible screen and coil around the reel. The reel is configured to affix first end of flexible screen and rotate to coil the flexible screen. The clamping member is configured to clamp a second end of the flexible screen opposite to the first end. The reel is further configured to rotate to drive, through the flexible screen, the reel and the clamping member to slide towards each other along the slide rail.

17 Claims, 5 Drawing Sheets

(52) U.S. Cl.
CPC ............... *G01N 2203/0075* (2013.01); *G01N 2203/0417* (2013.01); *G01N 2203/0647* (2013.01); *G09F 9/301* (2013.01)

(56) References Cited

U.S. PATENT DOCUMENTS

| | | | |
|---|---|---|---|
| 2019/0302848 A1* | 10/2019 | Han | G06F 1/1641 |
| 2019/0302851 A1 | 10/2019 | In et al. | |

FOREIGN PATENT DOCUMENTS

| | | | |
|---|---|---|---|
| CN | 204189829 U | | 3/2015 |
| CN | 204330366 U | | 5/2015 |
| CN | 104704350 A | | 6/2015 |
| CN | 106841895 A | | 6/2017 |
| CN | 107860561 A | | 3/2018 |
| CN | 107993573 A | | 5/2018 |
| CN | 108254274 A | | 7/2018 |
| CN | 207632197 U | | 7/2018 |
| CN | 109520714 A | | 3/2019 |
| CN | 208581211 U | * | 3/2019 |
| CN | 208632746 U | | 3/2019 |
| CN | 209342509 U | | 9/2019 |
| CN | 111122131 A | | 5/2020 |
| JP | 2016-540227 A | | 12/2016 |

OTHER PUBLICATIONS

English translation of CN208581211, accessed from iq.ip.com Feb. 21, 2024.*
International Search Report mailed on May 13, 2020, in corresponding to International Application No. PCT/ CN2020/074835; 8 pages (with English Translation).
The First Office Action for Chinese Application No. 202010025724.7, dated Feb. 3, 2021, 13 pages (with Machine Translation).
The Second Office Action for Chinese Application No. 202010025724.7, dated May 18, 2021, 10 pages (with Machine Translation).
The Third Office Action for Chinese Application No. 202010025724.7, dated Aug. 26, 2021, 8 pages (with Machine Translation).
Notice of Rejection for Chinese Application No. 202010025724.7, dated Jan. 6, 2022, 9 pages (with Machine Translation).

* cited by examiner

TEST APPARATUS FOR FLEXIBLE SCREEN

CROSS-REFERENCE TO RELATED APPLICATIONS

This application is a continuation of International Patent Application No. PCT/CN2020/125813, filed on Nov. 2, 2020, which claims priority to Chinese Patent Application No. 202010025724.7 filed on Jan. 10, 2020, disclosures of both of which are incorporated herein by reference in their entireties.

TECHNICAL FIELD

The present application relates to the field of display panel testing technology, for example, a testing apparatus for a flexible screen.

BACKGROUND

With the development of display technology and the improvement of people's living standards, a flexible screen is becoming the development trend of display screens in the future.

In the process of the development of the display screen technology, a testing device is necessary for detection and evaluation of the technical performance of a product. However, a coil testing device has the problem that the flexible screen does not fit properly around a reel, and thus the coil testing device is prone to damage caused by other stresses. The screen body cannot be tightly coiled on a coil rod. As a result, the coil radius is no longer a real coil radius after coiling. Consequently, a coil sample cannot be tested and evaluated very well.

SUMMARY

The present application provides a testing apparatus for a flexible screen to alleviate the problem of a large error in evaluating the coil characteristic of the screen body of the flexible screen.

An embodiment of the present application provides a testing apparatus for a flexible screen. The apparatus includes a slide rail, a reel, and a clamping member.

The reel is disposed at an end of the slide rail in the extension direction of the slide rail. The axial direction of the reel is perpendicular to the extension direction of the slide rail. The reel has a hollow structure. The reel is connected to a evacuating device through a gas path formed in the hollow structure to enable the evacuating device vacuumizes the inside of the reel to fit the flexible screen attach to the reel and coil around the reel. The reel is configured to affix a first end of the flexible screen and rotate to coil the flexible screen. The clamping member is configured to clamp a second end of the flexible screen opposite to the first end.

The reel is further configured to rotate to drive, through the flexible screen, the reel and the clamping member to slide towards each other along the slide rail.

The testing apparatus for a flexible screen provided in the present application includes the slide rail, the reel, and the clamping member. The reel is disposed at an end of the slide rail in the extension direction of the slide rail. The axial direction of the reel is perpendicular to the extension direction of the slide rail. The flexible screen includes the first end and the second end which are disposed opposite to each other. The reel is configured to affix the first end of the flexible screen. The reel rotates to coil the flexible screen. The clamping member is configured to clamp the second end of the flexible screen. The reel rotates to drive, through the flexible screen, the reel and the clamping member to relatively slide towards each other along the slide rail. The reel has a hollow structure. The reel is connected to the evacuating device through the gas path. The evacuating device is configured to vacuumize the inside of the reel to fit the flexible screen attach to the reel and coil around the reel. The testing apparatus for a flexible screen provided in the present application solves the problem that the flexible screen does not fit properly around the reel in the coil testing device and thus the coil testing device is prone to damage caused by other stresses, and alleviates the problem of a large error in evaluating the coil characteristic of the flexible screen by disposing the reel as the hollow structure and vacuumizing the inside of the reel to fit the flexible screen attach to the reel and coil around the reel through the evacuating device.

DETAILED DESCRIPTION

Figure 1:
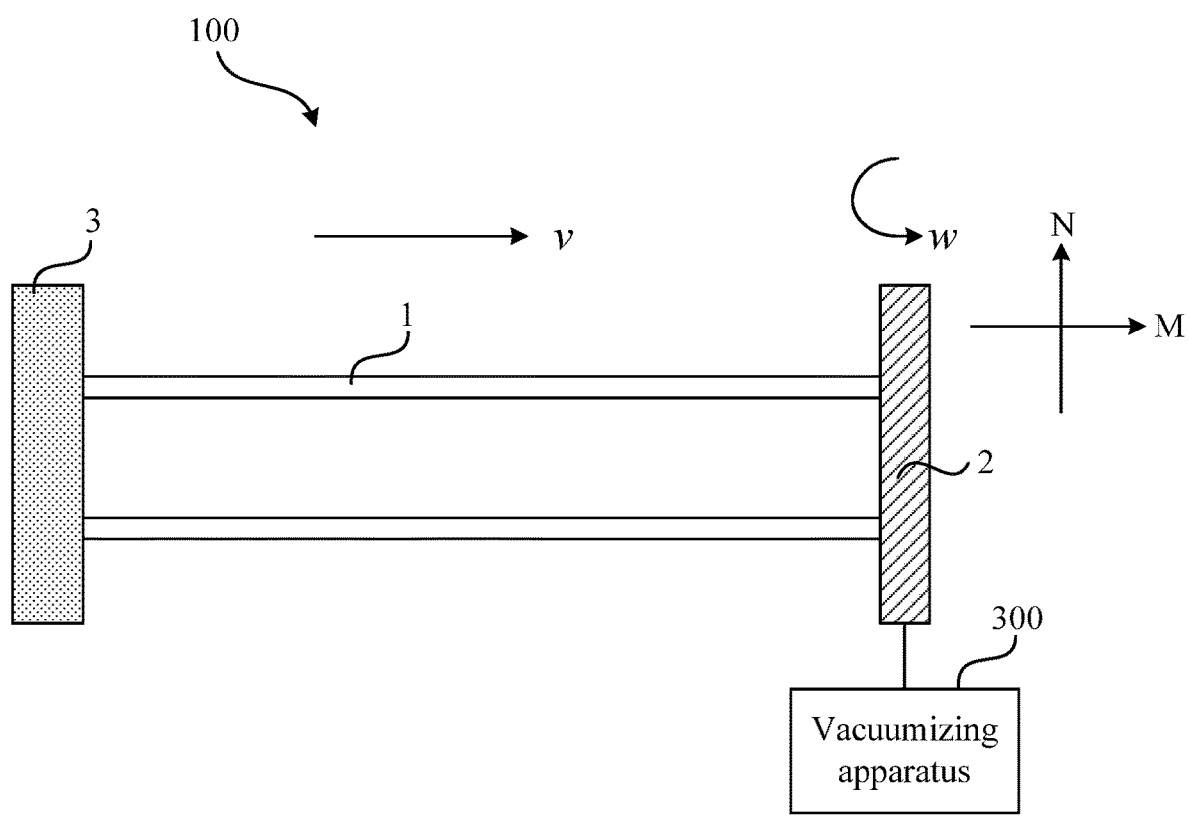
FIG. 1 is a view illustrating a structure of a testing apparatus for a flexible screen according to an embodiment of the present application.

The present application is described hereinafter in conjunction with drawings and an embodiment. The embodiment described herein is merely intended to explain, and not to limit, the present application. For ease of description, only part, not all, of the structures related to the present application are illustrated in the drawings.

The testing device for evaluating the coil performance of the flexible screen has the problem that the flexible screen does not fit properly around the reel, and thus the coil testing device is prone to damage caused by other stresses. Moreover, the screen body cannot be tightly coiled on the coil rod.

As a result, the coil radius is no longer the real coil radius after coiling. The coil sample cannot be tested and evaluated very well. If the flexible screen is clamped with the coil rod, the flexible screen bends at 90 degrees at an initial position. At the same time, this part is compressed and damages the flexible screen during coiling. If the flexible screen is affixed by an adhesive tape, the adhesiveness of the adhesive tape may damage a film layer of the flexible screen during the process of removing the adhesive tape after the testing. The coil velocity of the reel does not match the movement velocity of the clamping mechanism. As a result, the flexible screen cannot snugly fit to the reel during the testing process, resulting in distortion of the coil radius, or the inability of the screen body to keep flat due to arching, which leads to the problem of a large error in evaluating the coil characteristic of the screen body of the flexible screen.

The embodiment below proposes a structure of a testing apparatus for a flexible screen to solve the preceding problems.

Figure 2:
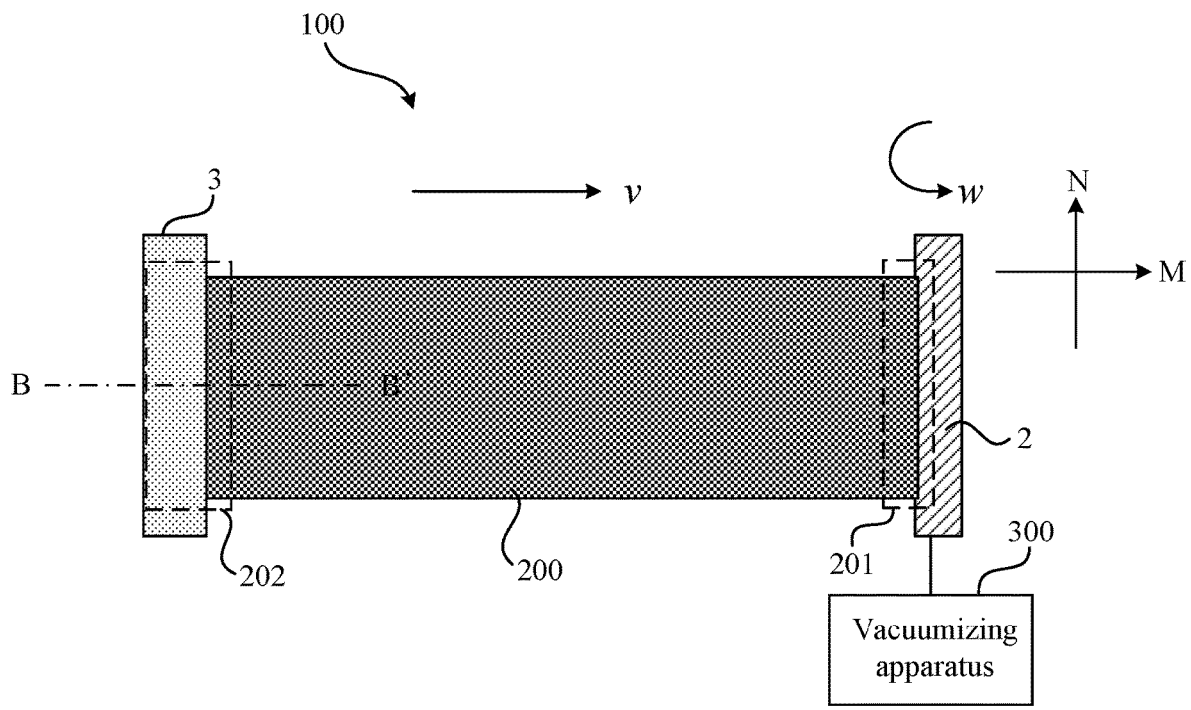
FIG. 2 is a view illustrating the structure of a testing apparatus for a flexible screen according to an embodiment of the present application when the apparatus performs a coil testing on the flexible screen.

FIG. 1 is a view illustrating the structure of a testing apparatus for a flexible screen according to an embodiment of the present application. FIG. 2 is a view illustrating the structure of a testing apparatus for a flexible screen according to an embodiment of the present application when the apparatus performs a coil testing on the flexible screen. Referring to FIG. 1 and FIG. 2, the testing apparatus 100 for a flexible screen provided in an embodiment of the present application includes the slide rail 1, the reel 2, and the clamping member 3. The reel 2 is disposed at an end of the slide rail 1 in the extension direction M of the slide rail 1. The axial direction N of the reel 2 is perpendicular to the extension direction M of the slide rail 1. The flexible screen 200 includes a first end 201 and a second end 202 which are disposed opposite to each other. The reel 2 is configured to affix the first end 201 of the flexible screen 200. The reel 2 rotates to coil the flexible screen 200. The clamping member 3 is configured to clamp the second end 202 of the flexible screen 200. The reel 2 rotates to drive, through the flexible screen, the reel 2 and the clamping member 3 to slide towards each other along the slide rail 1. The reel 2 has a hollow structure. The reel 2 is connected to the evacuating device 300 through the gas path. The evacuating device 300 is configured to vacuumize the inside of the reel 2 to fit the flexible screen 200 attach to the reel 2 and coil around the reel 2.

The reel 2 has a hollow structure. The evacuating device 300 vacuumizes the inside of the reel 2 so that the pressure in the hollow structure of the reel 2 is smaller than the pressure in the outside of the reel 2. The first end 201 of the flexible screen 200 is fitted to the reel 2 by a pressure difference between the inside and outside of the reel 2. The flexible screen 200 fits snugly to the reel 2 and coils around the reel 2 when the reel 2 rotates. As a result, the first end 201 of the flexible screen 200 is affixed on the reel 2. The clamping member 3 clamps the second end 202 of the flexible screen 200. The reel 2 rotates to coil the flexible screen 200. The reel 2 rotates to drive, through the flexible screen 200, the reel 2 to slide towards the clamping member 3 along the slide rail 1; or, the reel 2 rotates to drive, through the flexible screen 200, the clamping member 3 to slide towards the reel 2 along the slide rail 1. The evacuating device 300 vacuumizes the inside of the reel 2 to fit the flexible screen 200 attach to the reel 2 and coil around the reel 2, thereby reducing damage to the first end 201 of the flexible screen 200, and solving the problem that the coil testing device has an improper manner of fitting the flexible screen 200 with the reel 2 and is prone to damage caused by other stresses.

The testing apparatus for a flexible screen provided in the embodiment includes the slide rail, the reel, and the clamping member. The reel is disposed at an end of the slide rail in the extension direction of the slide rail. The axial direction of the reel is perpendicular to the extension direction of the slide rail. The flexible screen includes the first end and the second end which are disposed opposite to each other. The reel is configured to affix the first end of the flexible screen and rotate to coil the flexible screen. The clamping member is configured to clamp the second end of the flexible screen. The reel rotates to drive, through the flexible screen, the reel and the clamping member to slide towards each other along the slide rail. The reel has a hollow structure. The reel is connected to the evacuating device through the gas path. The evacuating device is configured to vacuumize the inside of the reel to fit the flexible screen attach to the reel and coil around the reel. The problem that the coil testing device has an improper manner of fitting the flexible screen with the reel and is prone to damage caused by other stresses is solved. The problem of a large error in evaluating the coil characteristic of the flexible screen is alleviated.

Figure 3:
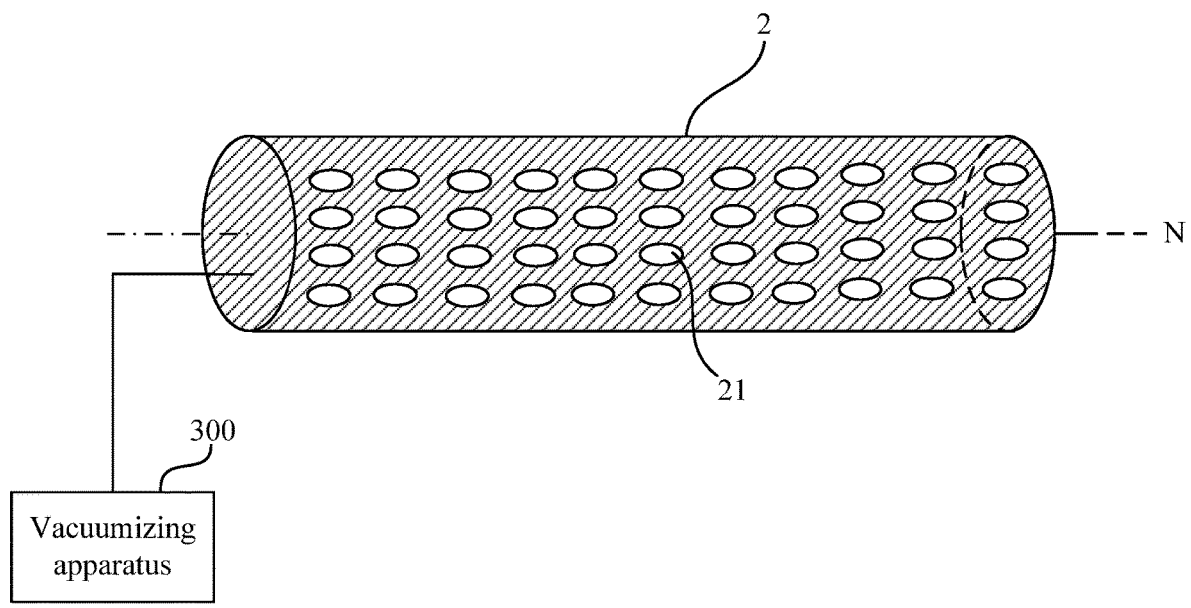
FIG. 3 is a view illustrating a structure of a reel of a testing apparatus for a flexible screen according to an embodiment of the present application.

In an embodiment, FIG. 3 is a view illustrating the structure of the reel of the testing apparatus for a flexible screen according to an embodiment of the present application. Referring to FIG. 3, a plurality of adsorbent holes 21 are disposed on the side wall of the reel 2. The adsorbent holes 21 are configured to form the gas path. The evacuating device 300 is configured to vacuumize the inside of the reel 2 and adsorb the flexible screen 200 through the adsorbent holes 21 to fit the flexible screen 200 attach to the reel 2 and coil around the reel 2.

The plurality of adsorbent holes 21 are disposed on the side wall of the reel 2 and can form the gas path. The evacuating device 300 vacuumizes the inside of the reel 2 and adsorbs the first coil of the flexible screen 200 through the adsorbent holes 21 to fit the first end 201 of the flexible screen 200 attach to the reel 2 and coil around the reel 2. In this manner, the radius of the first coil of the first end 201 of the flexible screen 200 connected to the reel 2 is not too large. Moreover, it is beneficial for the reel 2 to smoothly perform a coil testing on the flexible screen 200.

Figure 4:
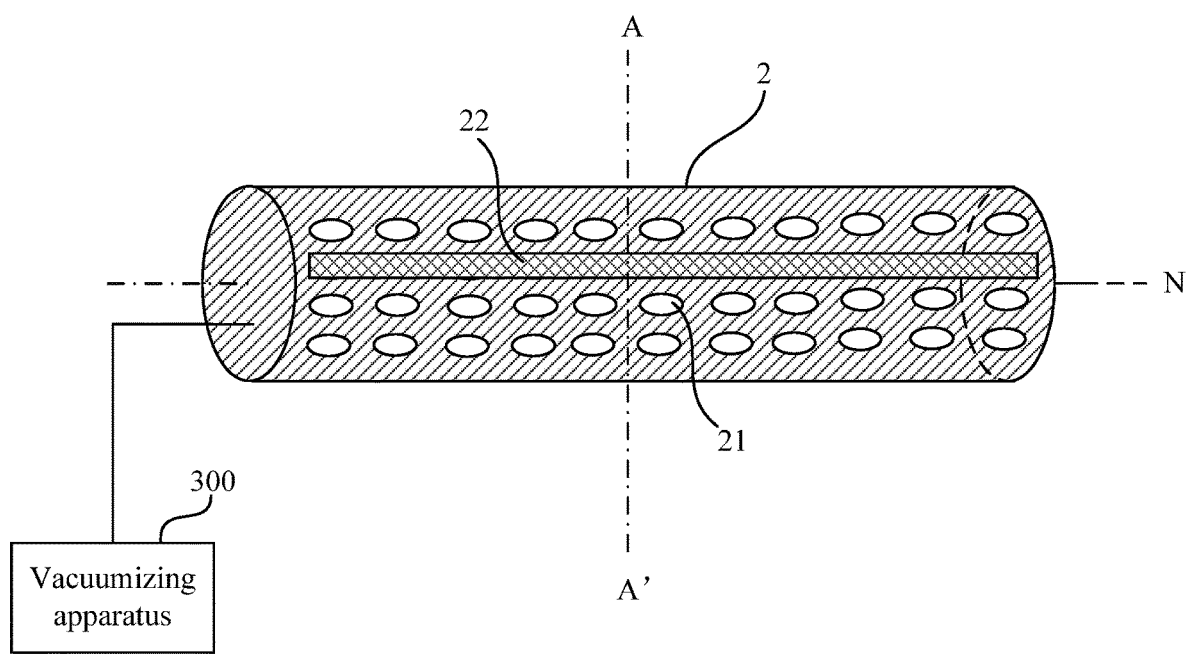
FIG. 4 is a view illustrating a structure of a reel of another testing apparatus for a flexible screen according to an embodiment of the present application.
Figure 5:
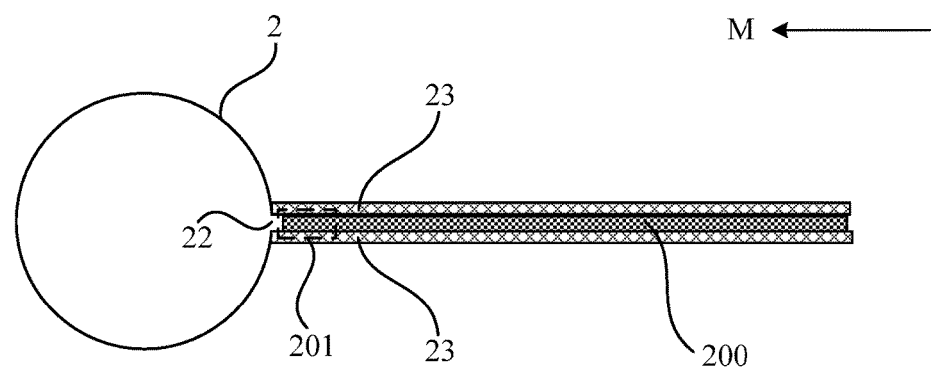
FIG. 5 is a section view illustrating the structure of a section of the reel of the testing apparatus for a flexible screen taken along A-A' according to an embodiment of the present application.

In an embodiment, FIG. 4 is a view illustrating the structure of the reel of another testing apparatus for a flexible screen according to an embodiment of the present application. FIG. 5 is a section view illustrating the structure of a section of the reel of the testing apparatus for a flexible screen taken along A-A' according to an embodiment of the present application. In conjunction with FIG. 4 and FIG. 5, a slot 22 extending in the axial direction N of the reel 2 is disposed on the side wall of the reel 2. Two thin film structures 23 are disposed at the slot 22 in a direction perpendicular to the axial direction N of the reel 2. The vacuumizing apparatus 300 is further configured to vacuumize the apace between the two thin film structures 23 through the slot 22 to clamp and affix the first end of the flexible screen 200 through the two thin film structures 23.

The slot 22 extending in the axial direction N of the reel 2 is disposed on the side wall of the reel 2. Two thin film structures 23 are disposed at the slot 22 in the direction perpendicular to the axial direction N of the reel 2. The two film structures 23 are affixed to the two sides of the slot 22 extending in the axial direction N of the reel 2. The flexible screen 200 is disposed between the two film structures 23. The first end 201 of the flexible screen 200 is directly opposite to the slot 22. The vacuumizing apparatus 300 is further configured to vacuumize the space between the two thin film structures 23 through the slot 22. Therefore, the pressure between the two film structures 23 and the two sides of the flexible screen 200 in a thickness direction is small. Moreover, the pressure of a side of the two film structures 23 away from the flexible screen 200 is a standard atmospheric pressure. Therefore, the two film structures 23 are clamped and affixed to the first end 201 of the flexible screen 200 through the pressure difference. The adhesive tape is prevented from being affixed the flexible screen 200. Moreover, the screen body is prevented from being damaged by a large folding angle due to the direct securing of the first end 201 of the flexible screen 200 with the reel 2. Not only the state of the fit between the flexible screen 200 and the reel 2 is ensured, but also the flexible screen 200 is not be damaged by the non-coiling stress. Moreover, the mounting and dismounting are facilitated.

It is feasible to fit the flexible screen 200 attach to the reel 2 and coil around the reel 2 by disposing adsorbent holes 21 in the side wall of the reel 2 to absorb the flexible screen 200, by using the slot 22 and the two film structures 23 or by using the preceding two manners at the same time.

In an embodiment, referring to FIG. 2, the reel 2 is affixed to the slide rail 1. The reel 2 rotates to drive, through the flexible screen 200, the clamping member 3 to slide along the slide rail 1 towards the reel 2; or, the clamping member 3 is affixed to the slide rail 1. The reel 2 rotates to drive, through the flexible screen 200, the reel 2 to slide along the slide rail 1 in a direction towards the clamping member 3.

This disposition makes the testing method of the flexible screen 200 more flexible. Therefore, the flexible screen 200 can attach to the reel 2 and coil around the reel 2.

Figure 6:
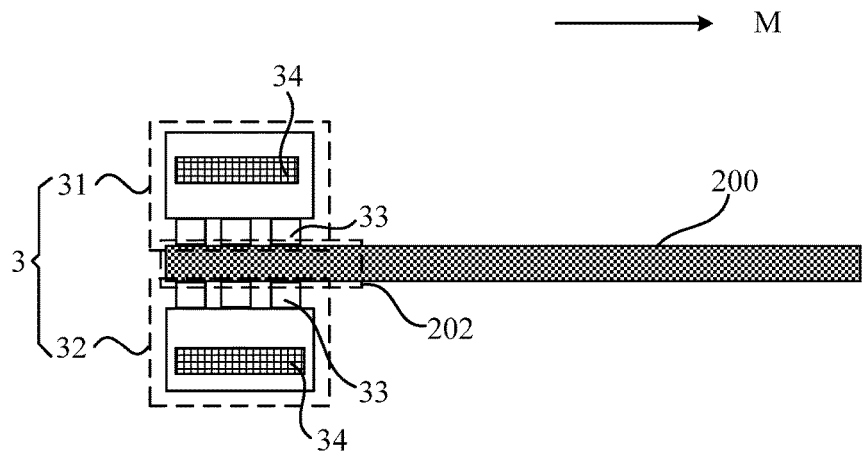
FIG. 6 is a section view taken along B-B' according to an embodiment of the present application when a testing apparatus for a flexible screen performs a coil testing on the flexible screen.

In an embodiment, the second end 202 of the flexible screen 200 fits snugly to a surface of the clamping member 3 away from the slide rail 1; or, FIG. 6 is a section view taken along B-B' according to an embodiment of the present application when a testing apparatus for a flexible screen performs a coil testing on the flexible screen. Referring to FIG. 6, the clamping member 3 includes a first clamping member 31 and a second clamping member 32. The first clamping member 31 and the second clamping member 32 are located on two sides of the clamped flexible screen 200 portion. The first clamping member 31 and the second clamping member 32 clamp the second end 202 of the flexible screen 200 via pressure points 33.

The second end 202 of the flexible screen 200 fits snugly to the surface of the clamping member 3 away from the slide rail 1 through the adhesive tape or in a mechanical manner. Therefore, the second end 202 of the flexible screen 200 is affixed to the clamping member 3. In an embodiment, the first clamping member 31 and the second clamping member 32 clamp the second end 202 of the flexible screen 200 via the pressure points 33. Therefore, the second end 202 of the flexible screen 200 directly contacts the pressing points 33. Therefore, the operation is simple. The fixing is convenient. The damage to the flexible screen 200 is reduced. Moreover, the dismounting of the flexible screen 200 after the testing is facilitated.

In an embodiment, referring to FIG. 6, alignment members 34 are disposed at a position of the clamping member 3. The alignment members 34 are configured to align the clamping member 3 with the second end 202 of the flexible screen 200. The alignment members 34 include infrared positioning members.

Before the coil testing of the flexible screen 200, the clamping member 3 clamps the second end 202 of the flexible screen 200. The alignment members 34 are disposed at the position of the clamping member 3. Therefore, the clamping member 3 is aligned with the second end 202 of the flexible screen 200 to ensure the correct mounting of the flexible screen 200 before the testing, and avoid the damage of the flexible screen 200 caused by the uneven force of the flexible screen 200 when the flexible screen 200 is coiling.

Figure 7:
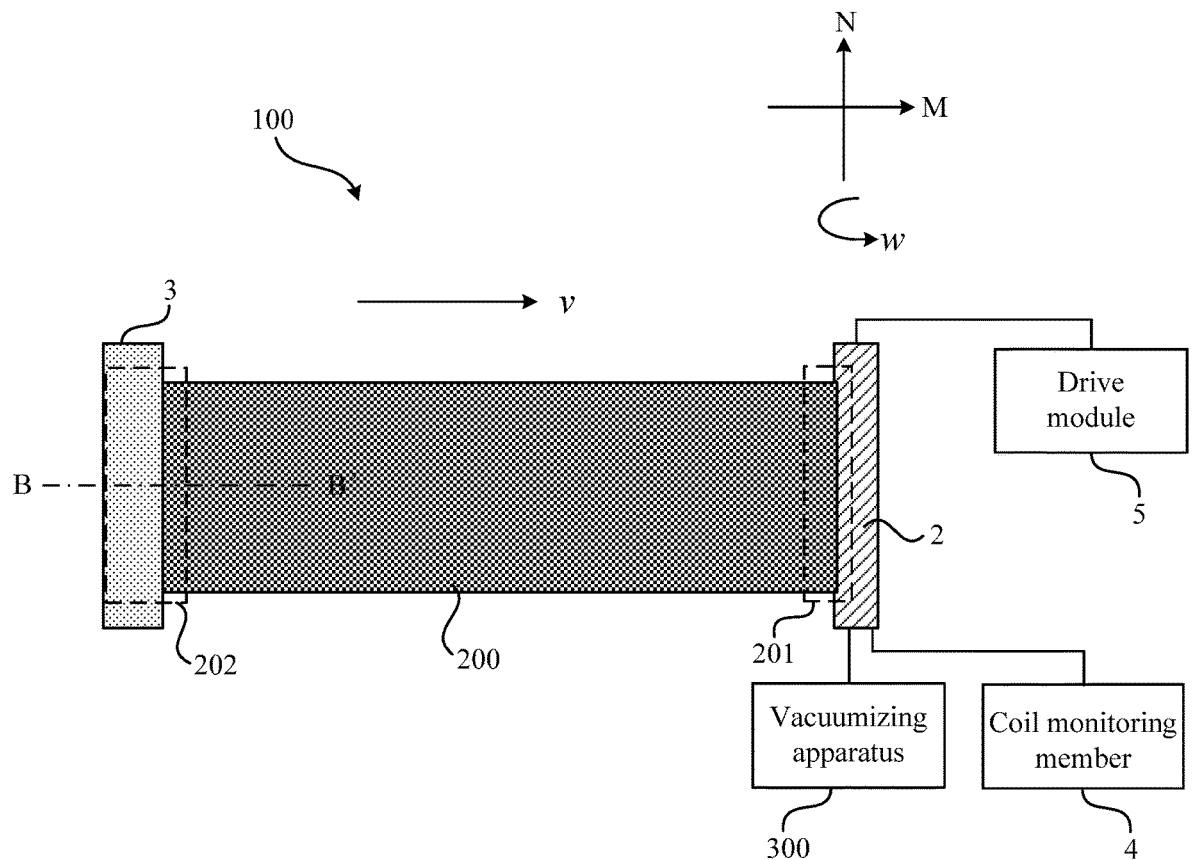
FIG. 7 is a view illustrating the structure of another testing apparatus for a flexible screen according to an embodiment of the present application when the apparatus performs a coil testing on the flexible screen.

In an embodiment, FIG. 7 is a view illustrating the structure of another testing apparatus for a flexible screen according to an embodiment of the present application when the apparatus performs a coil testing on the flexible screen. Referring to FIG. 7, the apparatus further includes a coil monitoring member 4 and a drive module 5. The coil monitoring member 4 is disposed on a side of the reel 2 in the axial direction N of the reel 2. The coil monitoring member 4 is configured to monitor the state of the fit between the flexible screen 200 and the reel 2 and generate a fit monitoring signal. The drive module 5 is configured to adjust the rotation angular velocity of the reel 2 according to the received fit monitoring signal.

The coil monitoring member 4 monitors the state of the fit between the flexible screen 200 and the reel 2 in real time and generates the fit monitoring signal. The drive module 5 adjusts the rotation angular velocity of the reel 2 according to the received fit monitoring signal. The drive module 5 increases the rotation angular velocity of the reel 2 in a case where the received fit monitoring signal indicates that a coil state is loose. The drive module 5 reduces the rotation angular velocity of the reel 2 in a case where the received fit monitoring signal indicates that the coil state is too tight. The drive module 5 maintains the rotation angular velocity of the reel 2 in a case where the received fit monitoring signal indicates that the coil state is within an appropriate range. Therefore, the flexible screen 200 can be ensured to attach to the reel 2 and coil around the reel 2. Moreover, the damage to the flexible screen 200 is reduced.

In an embodiment, the coil monitoring apparatus includes a subminiature camera.

The subminiature camera can acquire the fit state between the flexible screen 200 and the reel 2 in real time. The drive module 5 matches a coil velocity of the reel 2 according to the fit monitoring signal fed back by the subminiature camera, and controls a velocity of forward and backward movement of the reel 2 or the clamping member 3.

The coil monitoring member 4 is configured to monitor a distance between a surface of the flexible screen 200 coiled on the reel 2 farthest from the reel 2 and an outer surface of the reel 2 and generate the fit monitoring signal. The drive module 5 adjusts the rotation angular velocity ω of the reel 2 according to the distance, a thickness of the flexible screen 200, and the number of coils of the flexible screen 200 on the reel 2.

The drive module 5 adjusts the rotation angular velocity ω of the reel 2 according to the distance between the surface of the flexible screen 200 coiled on the reel 2 farthest from the reel 2 and the outer surface of the reel 2, the thickness of the flexible screen 200, and the number of coils of the flexible screen 200 on the reel 2. In an embodiment, the thickness of the flexible screen 200 is input. When the reel 2 turns 360°, that is, when the reel 2 turns one circle, the distance between the surface of the flexible screen 200 coiled on the reel 2 farthest from the reel 2 and the outer surface of the reel 2 is the thickness of one flexible screen 200. If the distance between the surface of the flexible screen 200 coiled on the reel 2 farthest from the reel 2 and the outer surface of the reel 2 is greater than the thickness of the flexible screen 200, the received fit monitoring signal indicates that the coil state of the reel 2 is loose, and the drive module 5 increases the rotation angular velocity ω of the reel 2.

Figure 8:
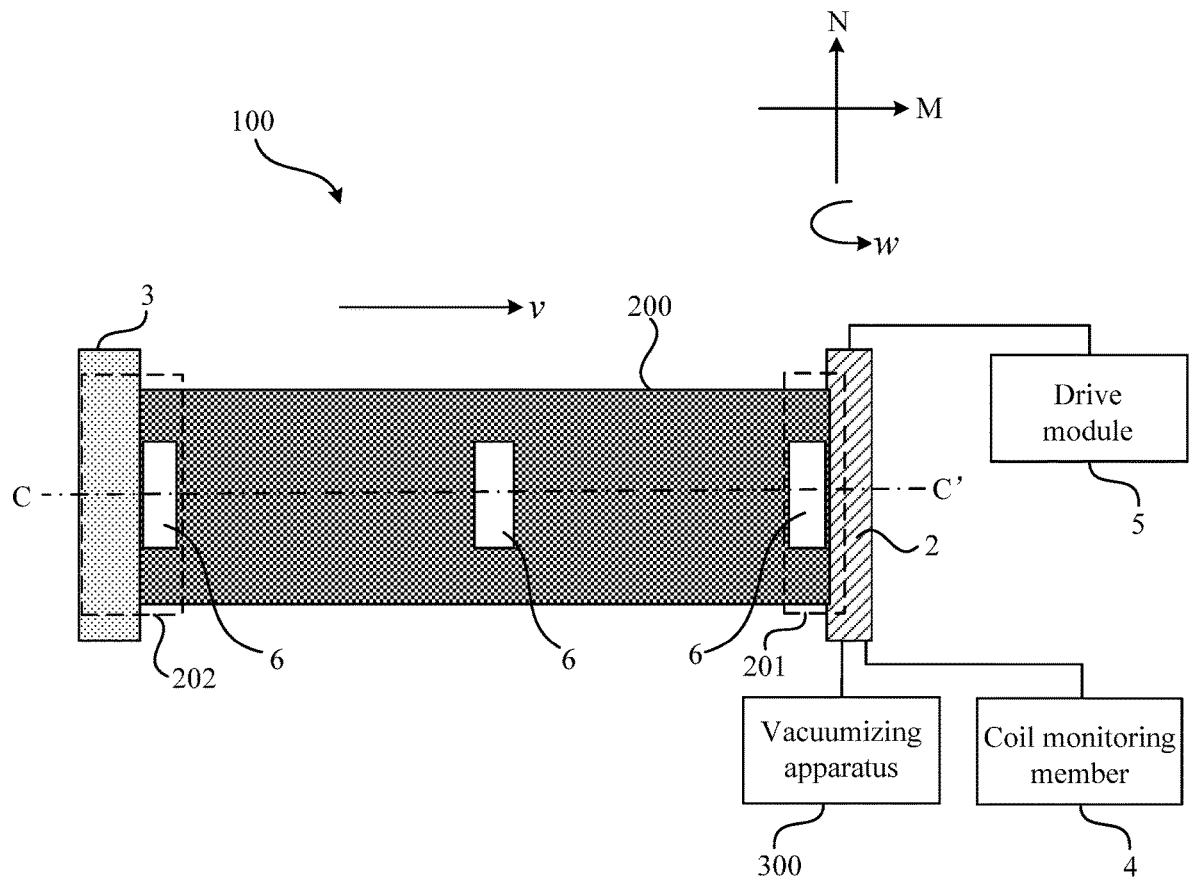
FIG. 8 is a view illustrating the structure of another testing apparatus for a flexible screen according to an embodiment of the present application when the apparatus performs a coil testing on the flexible screen.

In an embodiment, FIG. 8 is a view illustrating the structure of another testing apparatus for a flexible screen according to an embodiment of the present application when the apparatus performs a coil testing on the flexible screen. Referring to FIG. 8, the testing apparatus 100 for a flexible screen 200 further includes at least one tension sensing member 6. The tension sensing member 6 is configured to detect the tension received by the flexible screen 200 in the extension direction M of the slide rail 1 and generate a tension detection signal. The drive module 5 adjusts the rotation angular velocity ω of the reel 2 according to the received tension detection.

The apparatus can be disposed when the flexible screen 200 is in a normal coil range, a tension threshold range of the tension received by the flexible screen 200 in the extension direction M of the slide rail 1 is corresponded. The tension sensing member 6 detects the tension received by the flexible screen 200 in the extension direction M of the slide rail 1 and generates the tension detection signal. The drive module 5 reduces the rotation angular velocity ω of the reel 2 according to the received tension detection signal in a case where the tension detection signal is greater than a maximum value of the tension threshold range of the tension received by the flexible screen 200 in the extension direction M of the slide rail 1. The drive module 5 increases the rotation angular velocity ω of the reel 2 according to the received tension detection signal in a case where the tension detection signal is smaller than a minimum value of the tension threshold range of the tension received by the flexible screen 200 in the extension direction M of the slide rail 1. The drive module 5 maintains the rotation angular velocity ω of the reel 2 according to the received tension detection signal in a case where the tension detection signal is within the tension threshold range of the tension received by the flexible screen 200 in the extension direction M of the slide rail 1. FIG. 8 illustrates the case where the coil testing apparatus for a flexible screen 200 includes three tension sensing members 6.

Figure 9:
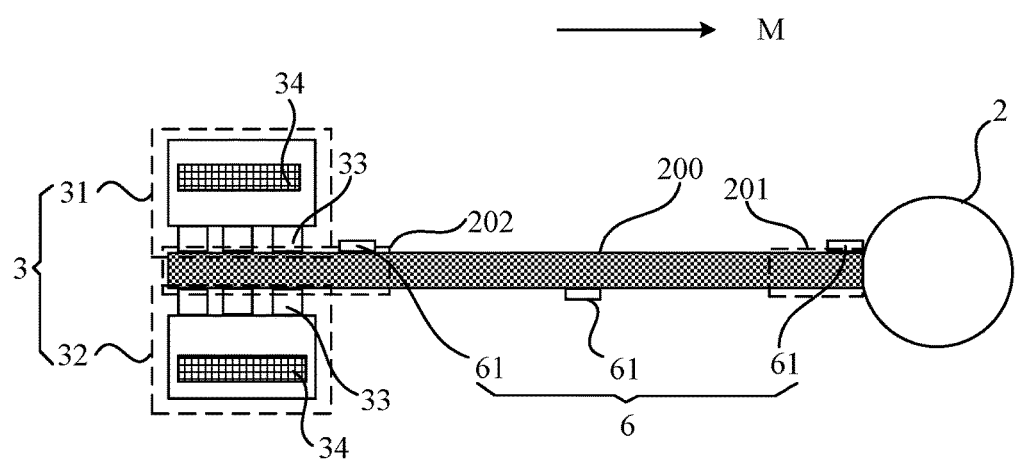
FIG. 9 is a section view taken along C-C' according to an embodiment of the present application when a testing apparatus for a flexible screen performs a coil testing on the flexible screen.

In an embodiment, referring to FIG. 8, the testing apparatus 100 for a flexible screen 200 includes at least two tension sensing members 6. The two tension sensing members 6 are disposed at different positions in the extension direction M of the slide rail 1. The testing apparatus 100 for a flexible screen 200 includes at least three tension sensing members 6. The three tension sensing members 6 are respectively disposed at the first end 201 of the flexible screen 200, the second end 202 of the flexible screen 200, and a center position between the first end 201 of the flexible screen 200 and the second end 202 of the flexible screen 200 in the extension direction M of the slide rail 1. FIG. 9 is a section view taken along C-C' according to an embodiment of the present application when a testing apparatus for a flexible screen performs a coil testing on the flexible screen. Referring to FIG. 9, each tension sensing member 6 includes at least one tension sensing sub-member 61. The tension sensing sub-member 61, in the thickness direction of the flexible screen, is disposed on at least one side of the flexible screen 200 and in contact with the flexible screen 200. The tension sensing member 6 includes a plurality of tension sensing sub-members 61. At least two tension sensing sub-members 61 are disposed on two sides of the flexible screen 200 in the thickness direction of the flexible screen 200. The tension sensing sub-members 61 include tension strain gauges. FIG. 9 illustrates the case where at least two tension sensing sub-members 61 are disposed on two sides of the flexible screen 200 in the thickness direction of the flexible screen 200.

This disposition makes it possible for the tension sensing member 6 detects the tension received by different positions of the flexible screen 200 in the extension direction M of the slide rail 1. The coil state of different positions of the flexible screen 200 is detected. Moreover, the generated tension detection signal is more consistent with the true coil state of the flexible screen 200. The detection of the coil effect of the flexible screen 200 is more accurate. The problem of a large error in evaluating the coil characteristic of the flexible screen is alleviated.

What is claimed is:

1. A testing apparatus for a flexible screen, comprising:
   a slide rail;
   a reel, wherein the reel is disposed at an end of the slide rail in an extension direction of the slide rail, an axial direction of the reel is perpendicular to the extension direction of the slide rail, the reel has a hollow structure, the reel is connected to a evacuating device through a gas path formed in the hollow structure to enable the evacuating device to vacuumize an inside of the reel to make the flexible screen attached to the reel and coil around the reel, and the reel is configured to affix a first end of the flexible screen and rotate to coil the flexible screen, the reel comprises two thin film structures disposed in a direction perpendicular to the axial direction thereof and a slot disposed between the two thin film structures and extending in the axial direction thereof; and
   a clamping member, wherein the clamping member is configured to clamp a second end of the flexible screen opposite to the first end and the reel is further configured to rotate to drive, through the flexible screen, the reel, and the clamping member to slide towards each other along the slide rail.

2. The apparatus of claim 1, wherein a plurality of adsorbent holes is disposed on a side wall of the reel, the adsorbent holes are configured to form the gas path, and the evacuating device is configured to vacuumize the inside of the reel and adsorb the flexible screen through the adsorbent holes to make the flexible screen attach attached to the reel and coil around the reel.

3. The apparatus of claim 1, wherein the evacuating device is further configured to vacuumize a space between the two thin film structures through the slot to clamp and affix the first end of the flexible screen through the two thin film structures.

4. The apparatus of claim 1, wherein the reel is affixed to the slide rail, and the reel is configured to rotate to drive, through the flexible screen, the clamping member to slide along the slide rail in a direction towards the reel; or
   the clamping member is affixed to the slide rail, and the reel is configured to rotate and drive, through the flexible screen, the reel to slide along the slide rail in a direction towards the clamping member.

5. The apparatus of claim 1, wherein the second end of the flexible screen is attached to a surface of the clamping member away from the slide rail; or
   the clamping member comprises a first clamping member and a second clamping member, wherein the first clamping member and the second clamping member are located on two sides of a portion of the clamped flexible screen, and the first clamping member and the second clamping member are configured to clamp the second end of the flexible screen via a pressure point.

6. The apparatus of claim 5, wherein the second end of the flexible screen is attached to the surface of the clamping member away from the slide rail through an adhesive tape or in a mechanical manner.

7. The apparatus of claim 1, further comprising:
an alignment member, wherein the alignment member is disposed at a position where the clamping member is located and the clamping member is aligned with the second end of the flexible screen.

8. The apparatus of claim 7, wherein the alignment member comprises an infrared positioning member.

9. The apparatus of claim 1, further comprising:
a coil monitoring member, wherein the coil monitoring member is disposed on a side of the reel in the axial direction of the reel and configured to monitor a fit state between the flexible screen and the reel and generate a fit monitoring signal.

10. The apparatus of claim 9, wherein the coil monitoring apparatus comprises a subminiature camera for real-time acquiring the fit state between the flexible screen and the reel.

11. The apparatus of claim 9, wherein the coil monitoring member is configured to monitor a distance between a surface of the flexible screen coiled on the reel farthest from the reel and an outer surface of the reel and generate the fit monitoring signal.

12. The apparatus of claim 1, further comprising:
at least one tension sensing member, wherein the at least one tension sensing member is configured to detect tension received by the flexible screen in the extension direction of the slide rail and generate a tension detection signal.

13. The apparatus of claim 12, wherein the at least one tension sensing member comprises at least two tension sensing members disposed at different positions in the extension direction of the slide rail.

14. The apparatus of claim 12, wherein the at least one tension sensing member comprises at least three tension sensing members respectively disposed at the first end of the flexible screen, the second end of the flexible screen, and a center position between the first end of the flexible screen and the second end of the flexible screen in the extension direction of the slide rail.

15. The apparatus of claim 12, wherein each of the at least one tension sensing member comprises at least one tension sensing sub-member, and in a thickness direction of the flexible screen, the at least one tension sensing sub-member is disposed on at least one side of the flexible screen and in contact with the flexible screen.

16. The apparatus of claim 12, wherein each of the at least one tension sensing member comprises a plurality of tension sensing sub-members, and in a thickness direction of the flexible screen, the plurality of tension sensing sub-members is disposed on two sides of the flexible screen.

17. The apparatus of claim 15, wherein each of the at least one tension sensing sub-member comprises a tension strain gauge.

* * * * *